(12) United States Patent
Chen et al.

(10) Patent No.: US 7,783,124 B2
(45) Date of Patent: Aug. 24, 2010

(54) METHOD FOR REDUCING IMAGE NOISE

(75) Inventors: Chao-Ho Chen, Tai-Nan (TW); Chao-Yu Chen, Kaohsiung County (TW)

(73) Assignee: Huper Laboratories Co., Ltd., Jong-Shan District, Taipei (TW)

(*) Notice: Subject to any disclaimer, the term of this patent is extended or adjusted under 35 U.S.C. 154(b) by 844 days.

(21) Appl. No.: 11/681,743

(22) Filed: Mar. 2, 2007

(65) Prior Publication Data
US 2008/0212889 A1      Sep. 4, 2008

(51) Int. Cl.
*G06K 9/40* (2006.01)
(52) U.S. Cl. .................... 382/260; 382/262
(58) Field of Classification Search .............. 382/260, 382/262, 254, 275, 278; 358/3.26, 3.27, 358/463
See application file for complete search history.

(56) References Cited

U.S. PATENT DOCUMENTS

| 7,003,174 B2 * | 2/2006 | Kryukov et al. ............. 382/266 |
| 7,437,013 B2 * | 10/2008 | Anderson .................... 382/261 |
| 2007/0196031 A1 * | 8/2007 | Chen et al. ................... 382/278 |

\* cited by examiner

*Primary Examiner*—Yon Couso
(74) *Attorney, Agent, or Firm*—Winston Hsu (57) ABSTRACT

A method for reducing image noise includes calculating a mean pixel-correlation between a central pixel and neighboring pixels within a working window in an image. The method also includes calculating a weighted horizontal similarity between the central pixel and horizontal neighboring pixels and a weighted vertical similarity between the central pixel and vertical neighboring pixels within the working window. Then, the method determines if the central pixel is noise. If so, a noise-reduction process is executed.

6 Claims, 9 Drawing Sheets

| Ratio of noise | Lena | Lizard |
|---|---|---|
| 0% | 89.3% | 72.7% |
| 5% | 81.7% | 65.8% |
| 10% | 74.5% | 61.2% |
| 15% | 67.6% | 56.7% |
| 20% | 61.1% | 50.7% |
| 25% | 55.0% | 46.9% |
| 30% | 48.3% | 42.2% |
| 35% | 43.1% | 36.8% |
| 40% | 38.2% | 33.1% |
| 45% | 32.8% | 30.2% |
| 50% | 26.9% | 24.9% |

| Ratio of noise | (PSNR) (dB) | | | | | |
| --- | --- | --- | --- | --- | --- | --- |
| | ATPMF filter | Truncation filter | DRID filter | CSAM filter | MSM filter | Filter of the present invention |
| 5% | 33.03 | 27.72 | 31.24 | 30.61 | 38.67 | 39.49 |
| 10% | 32.55 | 22.88 | 26.2 | 30.35 | 36.42 | 34.96 |
| 15% | 32.03 | 20.11 | 23.14 | 30.05 | 33.96 | 34.04 |
| 20% | 31.46 | 18.22 | 20.98 | 29.7 | 31.46 | 33.02 |
| 25% | 30.79 | 16.82 | 19.3 | 29.29 | 29.07 | 31.70 |
| 30% | 29.96 | 15.72 | 17.95 | 28.81 | 26.86 | 31.08 |
| 35% | 28.90 | 14.82 | 16.82 | 28.23 | 24.92 | 30.15 |
| 40% | 27.58 | 14.08 | 15.85 | 27.49 | 23.16 | 29.14 |
| 45% | 26.07 | 13.43 | 15.01 | 26.53 | 21.61 | 28.21 |
| 50% | 24.46 | 12.87 | 14.26 | 25.34 | 20.22 | 27.04 |

Fig. 8

| Ratio of noise | (PSNR) (dB) | | | | | |
|---|---|---|---|---|---|---|
| | ATPMF filter | Truncation filter | DRID filter | CSAM filter | MSM filter | Filter of the present invention |
| 5% | 21.23 | 24.22 | 25.3 | 19.61 | 23.44 | 21.56 |
| 10% | 21.07 | 20.36 | 21.76 | 19.55 | 22.99 | 21.32 |
| 15% | 20.88 | 18.02 | 19.28 | 19.47 | 22.43 | 21.07 |
| 20% | 20.68 | 16.36 | 17.42 | 19.37 | 21.75 | 20.76 |
| 25% | 20.42 | 15.1 | 15.97 | 19.23 | 20.95 | 20.43 |
| 30% | 20.09 | 14.12 | 14.82 | 19.07 | 20.04 | 20.06 |
| 35% | 19.68 | 13.31 | 13.89 | 18.86 | 19.10 | 19.75 |
| 40% | 19.18 | 12.61 | 13.08 | 18.58 | 18.14 | 19.27 |
| 45% | 18.57 | 12.01 | 12.4 | 18.21 | 17.18 | 18.82 |
| 50% | 17.83 | 11.48 | 11.78 | 17.72 | 16.25 | 18.36 |

Fig. 9

METHOD FOR REDUCING IMAGE NOISE

BACKGROUND OF THE INVENTION

1. Field of the Invention

The present invention relates to a method for reducing image noise, and more specifically, to a method for reducing image noise through calculating a mean pixel-correlation between a central pixel and its neighboring pixels, selecting an appropriate working window to reduce image noise, and calculating a weighted horizontal similarity between the central pixel and the horizontal neighboring pixels and a weighted vertical similarity between the central pixel and the vertical neighboring pixels.

2. Description of the Prior Art

Image information plays a very important role in multimedia communications today. However, no image is perfect due to image noise.

Principal sources of noise in digital images arise during image acquisition (digitization) and/or transmission. Performance of imaging sensors is affected by a variety of factors, such as environmental conditions during image acquisition, and by the quality of the sensing elements themselves. For instance, in acquiring images with a CCD camera, luminosity and sensor temperature are major factors affecting the amount of noise present in the generated images. Images are corrupted during transmission principally due to interference in channels used for transmission. For example, an image transmitted through a wireless network might be disturbed as a result of lightning or other atmospheric charged particles.

Filtering a digital image is one necessary part of image processing, and is used for reducing noise while protecting image details. For example, any noise in images will result in serious errors due to many applications being based on operands drawn out from applications for calculating images. Therefore, filtering methods for reducing noise are desired not only to improve the visual quality, but also to improve the performance of subsequent processing tasks, such as coding, analyzing, segmenting, recognition, or interpretation.

In digital images, image pixels usually experience interference from impulse noise due to wrong image acquisition equipment, poor image acquisition conditions, or errors in image transmission. Impulse noise is discovered easily by human eyes and causes serious mistakes in image processing applications. Hence, impulse noise reduction is used for front-end processing in some image processing systems, such as image quantification.

A best impulse noise filter must have capacity to smooth non-similar pixels in identical areas to retain edge information, and not change any natural image information. Different impulse noise reduction algorithms have already been disclosed in previous years, their purposes being to filter impulse noise and to keep image detail at the same time. Some typical non-linear filters, such as median filters and weighted median filters, are used for reducing almost all impulse noise and keeping almost all image detail.

Applications of reducing image noise have already been disclosed in the prior art. For example, a differential rank impulse detector (DRID) is provided for detecting impulse noise effectively.

In a working window, the difference between the arrangement sequence of impulse noise and the arrangement sequence of a center pixel is very large. The median values in different sequences always lie in the middle, but the median value of the impulse noise lies near two extremities. A simple impulse noise detector can be obtained for this reason. Its concept is comparing the location of an interested pixel with a threshold, and can be expressed in the following equation:

$$(R(X_{i,j}) \leq s) \vee (R(X_{i,j})) \geq N-s+1;$$

wherein $X_{i,j}$ is a center pixel of a working window, $R(X_{i,j})$ is a rank after sorting, N is a number of pixels in the working window, and s is a threshold value.

It is easy to determine noise interference and to get a great reduction effect through this method, but there are many erroneous judgments, and whether a pixel experiences interference from noise is not guaranteed. A pixel will be regarded as noise if it does not experience interference from noise and lies near the two extremities. In order to overcome this problem, not only the sorting sequence, but also the grayscale value, should be considered. The algorithm can be expressed as another equation.

$$(R(X_{i,j}) \leq s) \vee (R(X_{i,j}) \geq (N-s+1)) \wedge (d_{i,j} \geq \theta);$$

wherein, $d_{i,j}$ can be expressed as:

$$d_{i,j} \equiv \begin{cases} |x_{i,j} - Var[R(x_{i,j})-1]|, & \text{if } R(x_{i,j}) > MED_{i,j} \\ |x_{i,j} - Var[R(x_{i,j})+1]|, & \text{if } R(x_{i,j}) < MED_{i,j} \\ 0, & \text{else} \end{cases}$$

Var (k) is the grayscale value of a sorting k. The detector provides an effective and fast method based on comparing the locations of the pixels within the working window with an absolute value. There is no smooth image in this method, and this method can be applied to any other filter.

In the prior art, a conditional signal-adaptive median filter (CSAM) is provided to reduce image noise. The CSAM filter is a median filter based on judgments. The filter consists of two primary functions: necessary conditions for determination, and a method for filtering noise. The first function is used for determining whether noise exists in a working window, and the second function is used for smoothing a pixel value of the noise.

The algorithm is expressed as the following:

Step 1: Calculate upper limits and lower limits in identical areas.

Step 2: Detect impulse noise.

In a 3×3 working window, let a center pixel be $x_0$, 8 neighboring pixels be $x_i|_{i=1}^8$, $c_h$ be an identical number of pixels among the center pixel $x_0$ and the 8 neighboring pixels, and $c_i$ be a non-identical number of pixels among the center pixel $x_0$ and the 8 neighboring pixels. The center pixel $x_0$ is determined as a signal if the value $c_h$ is greater than the value $c_i$, and is determined as a noise candidate if the value $c_h$ is less than the value $c_i$.

Step 3: Refine the selected impulse noise.

A different filtering method is utilized to remove pixels not experiencing interference from noise from the noise candidate set to decrease error detections. Erroneous detected pixels mostly lie near edges or in image details.

Those pixels are divided into two groups: one group similar to the center pixel, and the other group not similar to the center pixel. The center pixel is determined as a signal and is removed from the noise candidate set if the number of pixels that are similar to the center pixel is greater than the number of pixels that are not similar to the center pixel. The step is executed continuously until the number of the noise candidate set does not decrease anymore.

Step 4: Use a median filter to reduce noise.

A 3×3 median filter is used to reduce noise in a 3×3 working window if the number of pixels that are similar to the center pixel is less than 3. Otherwise, a 5×5 median filter is used to reduce noise.

The objective of the method is to reach perfect impulse noise detection and to keep superior visible quality after restoration.

Furthermore, a Truncation filter can also be utilized to reduce image noise, wherein x(i,j) represents a grayscale of a pixel (i,j), and N square windows of M×M size having the pixel (i,j) can be found. This kind of window is called an internal window and is expressed as WIk.

For each internal window, a corresponding external window WOk of (M+2r)×(M+2r) size can be found, wherein r≧1. The internal window WIk and the corresponding external window WOk have the same center. In such a manner, N close surrounding bands BK having a thickness r can be found (wherein K=1 . . . N). The close surrounding bands BK are defined as BK=WOk−WIk. Suppose $u_k$ and $v_k$ represent the maximum grayscale and the minimum grayscale in each close surrounding band BK. The maximum grayscale and the minimum grayscale of its surrounding groups are used for determining whether noise interference exists. The objective of this method is to protect image details when reducing noise.

It should be mentioned that an adaptive two-pass median filtering (ATPMF) can also be utilized to reduce image noise. Sorting filters, such as median filters, may result in poor performance when the noise ratio is high. Proceeding with this kind of filter twice achieves better performance, hence the name "two-pass."

This method achieves two goals. First, more noise can be reduced by utilizing this two-pass median filtering algorithm than a general median filtering one when the noise ratio is high. Next, estimated space distribution of the impulse noise is utilized to correct errors resulting from the first filtering. The concept of this method is described in the following.

Step 1: Obtain the estimated space distribution and the impulse noise values by utilizing a median filter to reduce image noise.

Step 2: Determine which pixels are over-corrected after reducing noise in step 1, and use original pixel values to replace these pixel values and keep these values as constant values in step 3.

Step 3: Use the median filter to reduce image noise again.

The objective of this method is reducing image noise in an image that experiences interference from impulse noise of a high noise ratio, and the method can be applied to any sorting filter.

Thus it can be seen that numerous image noise reduction algorithms have already been disclosed in the prior art. However, in some algorithms, only images that are interfered by impulse noise of a high noise ratio are suitable for use. And in some conditions, erroneous judgment may happen. Moreover, both reducing noise effectively and protecting image detail should be a concern.

SUMMARY OF THE INVENTION

Some concepts of the present invention have already been published in the proceedings of conference, as described below: Thou-Ho (Chao-Ho) Chen, Chao-Yu Chen, Tsong-Yi Chen, and Da-Jinn Wang, "An Impulse Noise Reduction Method by Adaptive Pixel-Correlation", 2006 International Conference on Innovative Computing, Information and Control (ICICIC-06), Beijing, P.R. China, Aug. 30-Sep. 1, 2006, pp. 257-260.

The present invention provides a method for reducing image noise comprising dividing an image into geometric working windows, each geometric working window being composed of a central pixel and its neighboring pixels; calculating mean pixel-correlations of two adjacent thresholds; calculating a difference of the mean pixel-correlations of the two adjacent thresholds; determining whether the difference is less than or equal to a first predetermined value, and if so, recording a pixel-correlation; determining whether the pixel-correlation is less than a second predetermined value, and if so, using a large working window to reduce image noise; determining whether the pixel-correlation is greater than or equal to the second predetermined value, and if so, using a small working window to reduce image noise; calculating a weighted horizontal similarity between the central pixel and horizontal neighbor pixels and a weighted vertical similarity between the central pixel and vertical neighbor pixels; determining whether both the weighted horizontal similarity between the central pixel and the horizontal neighbor pixels and the weighted vertical similarity between the central pixel and the vertical neighbor pixels are less than or equal to a third predetermined value, and if so, outputting the central pixel value directly; and determining whether both the weighted horizontal similarity between the central pixel and the horizontal neighbor pixels and the weighted vertical similarity between the central pixel and the vertical neighbor pixels are greater than the third predetermined value, and if so, outputting the central pixel value through a median filter.

The following effects can be achieved by the said method.

1. Increase in noise-reduction efficiency: an appropriate working window can be chosen efficiently according to the present invention.

2. Reduction in image noise quickly and correctly: image noise can be reduced quickly and correctly through calculating a mean pixel-correlation of the central pixel and the neighboring pixels, a weighted horizontal similarity between the central pixel and the horizontal neighbor pixels, and a weighted vertical similarity between the central pixel and the vertical neighbor pixels in the appropriate working window according to the present invention.

These and other objectives of the present invention will no doubt become obvious to those of ordinary skill in the art after reading the following detailed description of the preferred embodiment that is illustrated in the various figures and drawings.

DETAILED DESCRIPTION

The present invention relates to a method for reducing image noise. The present invention can be seen in several levels. The first level determines whether the image pixel-correlations experience interference from noise based on an n×n working window. An image pixel-correlation is defined as follows:

$$LC_{ik} = \begin{cases} 1, & |x_0 - x_k| < T \\ 0, & \text{otherwise} \end{cases}, 1 \leq k \leq n^2 - 1 \text{ and } 1 \leq i \leq N$$

wherein $x_0$ represents the central pixel in the working window, $x_k$ represents other pixels in the working window, N represents the number of all pixels, T is a predetermined value defined by a user, and the shape of the working window can be another geometric form.

If the resulting LCik is 1, it represents that there a pixel-correlation exists between the central pixel $x_0$ and the neighboring pixel $x_k$. Otherwise, it represents that there no pixel-correlation exists between the central pixel $x_0$ and the neighboring pixel $x_k$.

Next, a mean pixel-correlation is generated by summing the pixel-correlations in all working windows and then dividing the sum of the pixel-correlations by the number of total pixels. The algorithm can be expressed by the following equation:

$$GC_k = \frac{1}{N} \sum_{i=1}^{N} LC_{ik}, 1 \leq k \leq n^2 - 1 \text{ and } 1 \leq i \leq N$$

The value of $GC_k$ will lie between 0 and 1 (0%-100%) after calculation. The percentage of $GC_k$ increases when the threshold increases.

Figure 1:
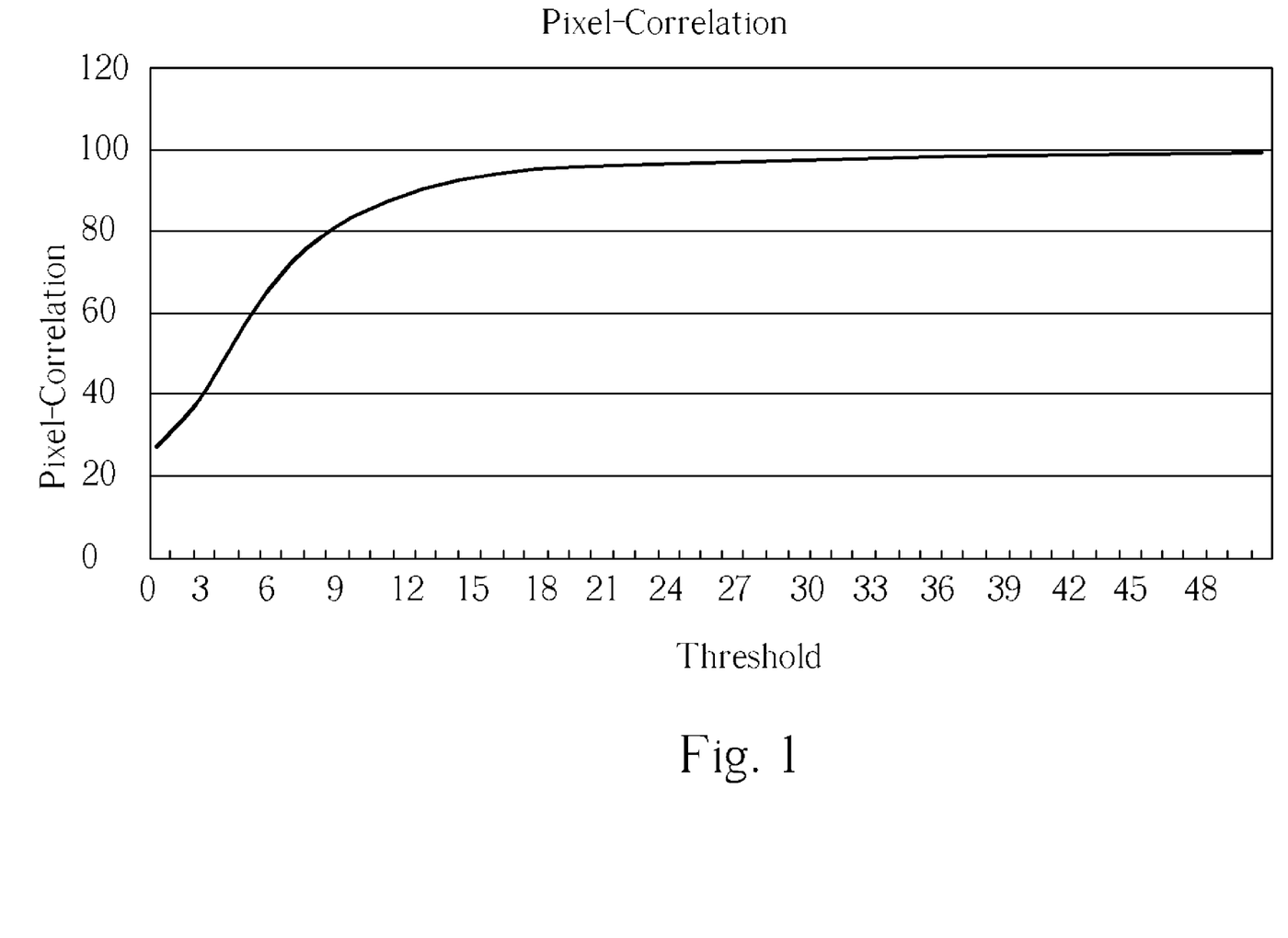
FIG. 1 is a curve diagram of a mean pixel-correlation of a test image (Lena).
Figure 2:
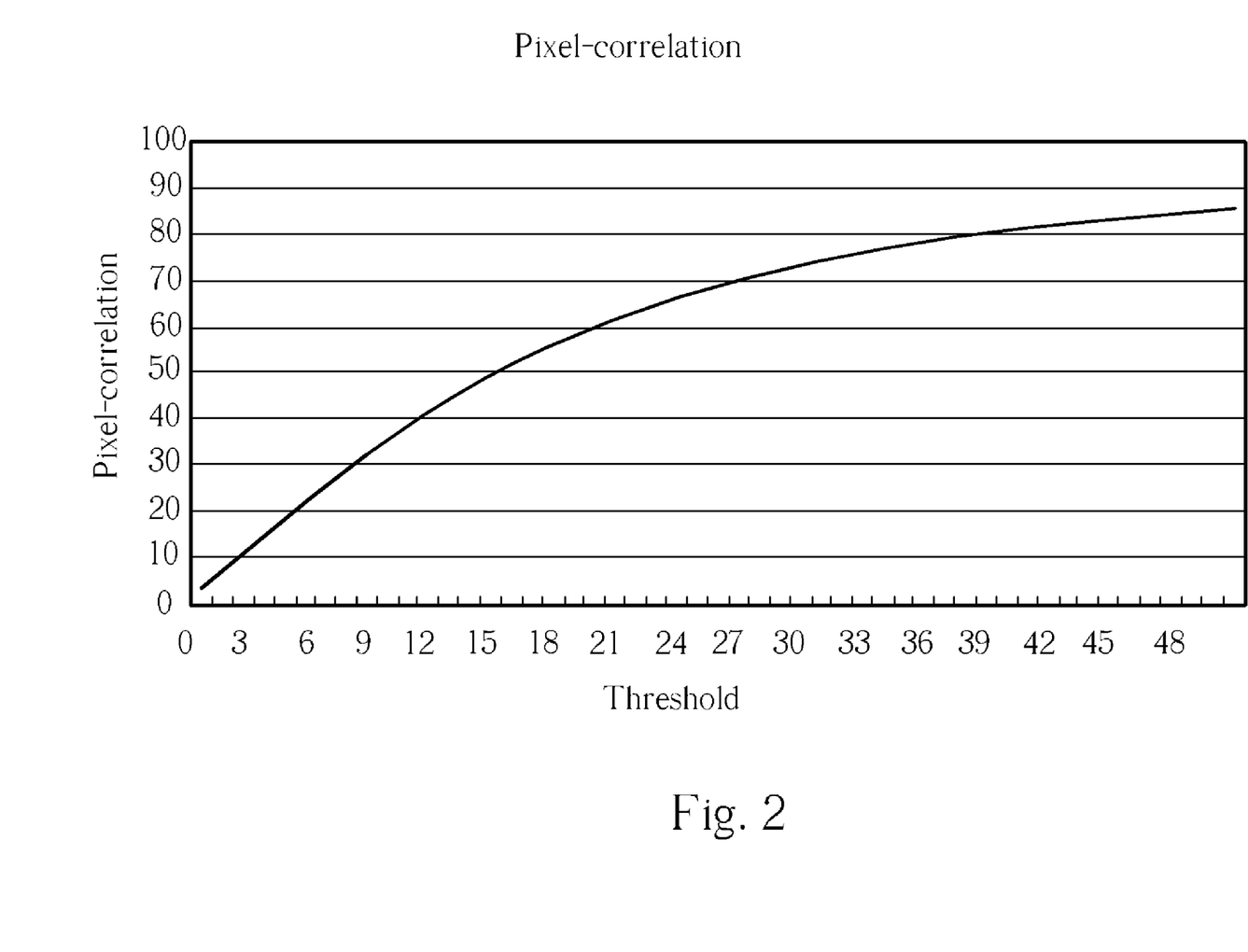
FIG. 2 is a curve diagram of the mean pixel-correlation of a test image (Lizard).
Figure 3:
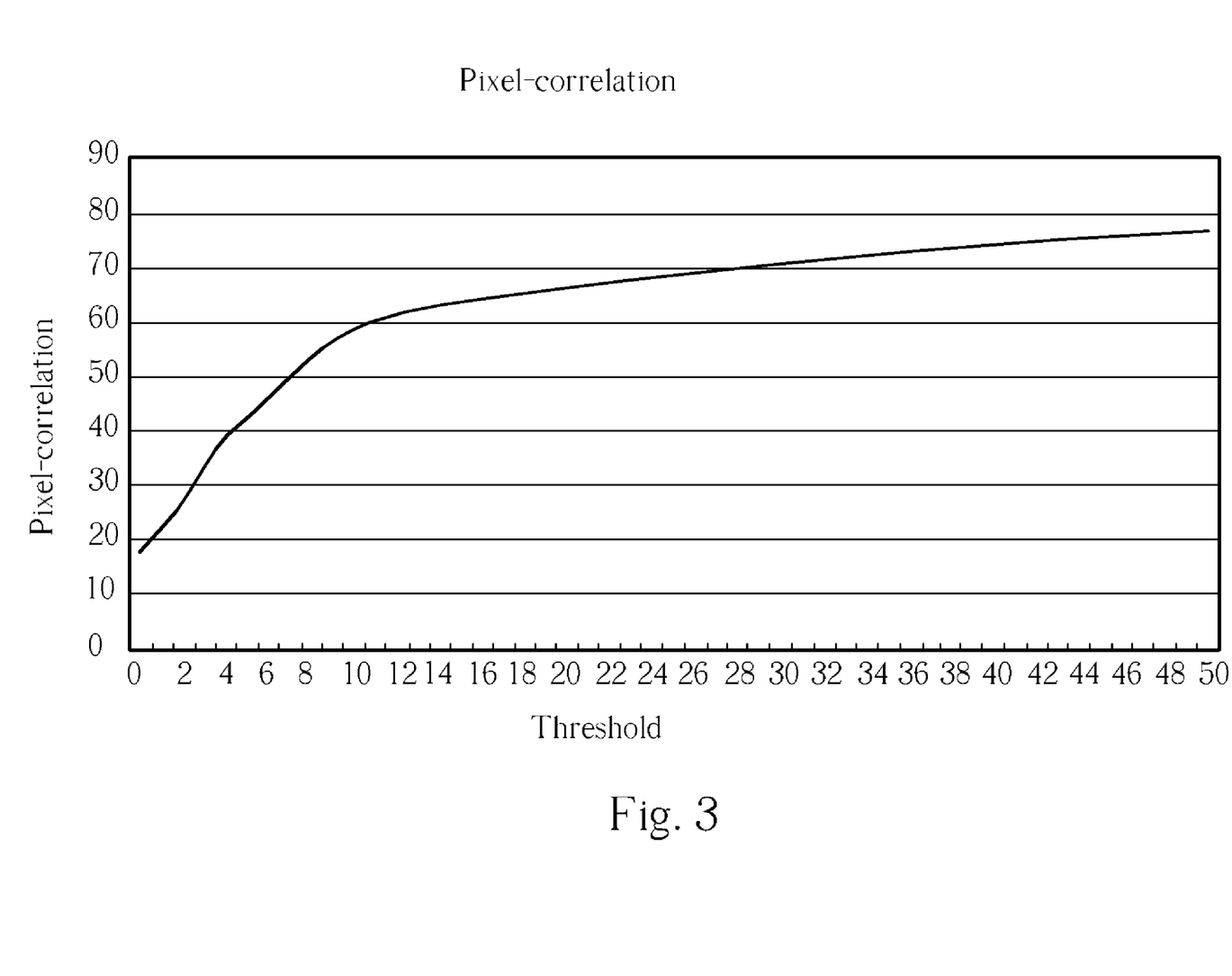
FIG. 3 is a curve diagram of the mean pixel-correlation of the test image (Lena) when 20% impulse noise is added to the test image (Lena).
Figure 4:
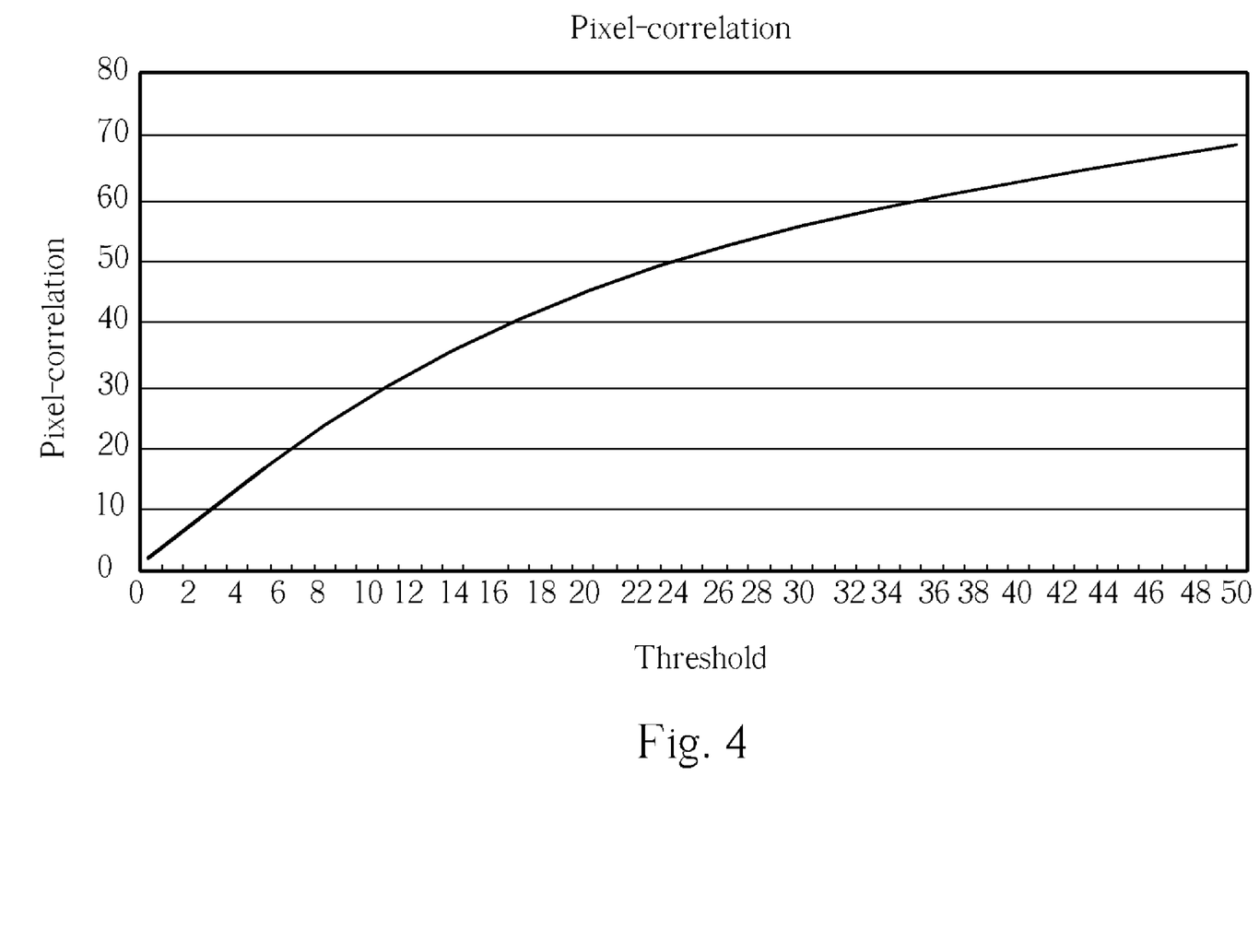
FIG. 4 is a curve diagram of the mean pixel-correlation of the test image (Lizard) when 20% impulse noise is added to the test image (Lizard).

The present invention utilizes two different test images (Lena and Lizard) to calculate a mean pixel-correlation of a central pixel and upper neighboring pixels. The predetermined value T is set from 0 to 50. The results are shown in FIG. 1 and FIG. 2. Next, 20% image impulse noise is added to the said images to calculate a mean pixel-correlation of a central pixel and upper neighboring pixels, wherein the values of pixels are distributed uniformly between 0 and 255, and the predetermined value T is set from 0 to 50. The results are shown in FIG. 3 and FIG. 4.

Please refer to FIG. 1, FIG. 2, FIG. 3, and FIG. 4. It can be seen that the amplification of the mean pixel-correlation is maximum when the predetermined value T is less than 20, especially in the images having more smooth zones. The amplification of the mean pixel-correlation lowers with the increasing predetermined value T. It shows clearly that the ratios among the smooth zones, edges, and non-smooth zones are principal factors influencing the amplification rate of the mean pixel-correlation.

Figure 5:
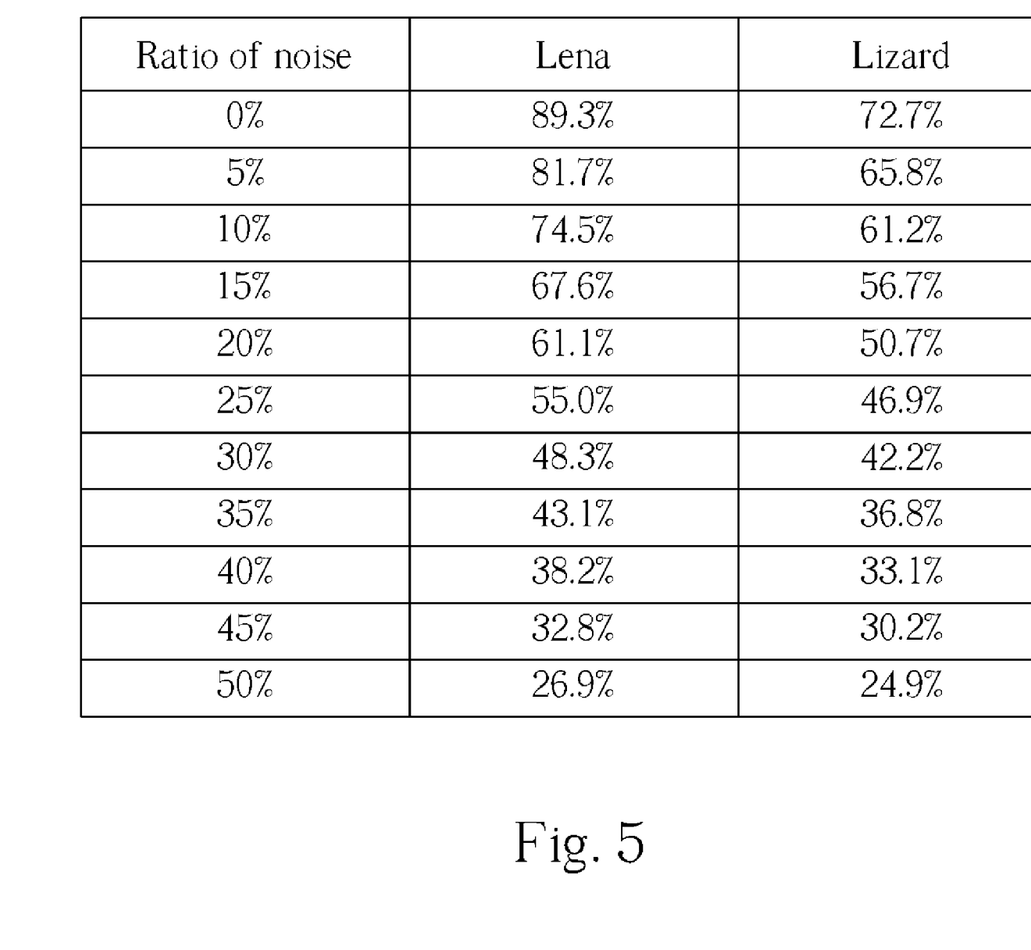
FIG. 5 is a numerical diagram of the mean pixel-correlations of the test images when the impulse noise ranging from 0% to 50% is added to the test images.

Because preserving natural image information is important when reducing image noise, the present invention sets corresponding predetermined values $T_i$ (first predetermined value) for different images, respectively. The value of the mean pixel-correlation $(LC_{ik})_j$ is recorded when the amplification of the mean pixel-correlation is less than the first predetermined value $T_i$ (please refer to FIG. 5). The algorithm can be expressed by the following equation:

$$GC_{different} = \frac{1}{N} \sum_{i=1}^{N} [(LC_{ik})_j - (LC_{ik})_{j-1}],$$

$$1 \leq k \leq n^2 - 1, 1 \leq i \leq N \text{ and } 0 \leq j \leq 255$$

until $GC_{different} \leq T_i$

Next, it is determined whether the mean pixel-correlation is larger than another predetermined value $T_c$ (second predetermined value). If the mean pixel-correlation is larger than the predetermined value $T_c$, a small working window is utilized to reduce image noise. Otherwise, a large working window is utilized to reduce image noise.

The present invention utilizes a fuzzy method to detect image impulse noise. The content of the method comprises that the further the distance is between a central pixel and the neighboring pixel in a working window, the lower the mean pixel-correlation is. For example, the mean pixel-correlation can lower with the increase of Euclidean distance. Therefore, the inverse of Euclidean distance is set to the weighted value of each pixel according to the value of Euclidean distance between the central pixel and the neighboring pixel. The algorithm can be expressed by the following equation:

$$w = \frac{1}{L_i}$$

wherein $L_i$ represents Euclidean distance.

Next, it is determined whether the weighted horizontal similarity between the central pixel and the horizontal neighboring pixels and the weighted vertical similarity between the central pixel and the vertical neighboring pixels are less than a predetermined value $T_a$ (third predetermined value). The algorithm can be expressed by the following equation:

$$D = \sum w_i x_0 - \sum w_i x_i$$

$$\beta_i = \begin{cases} 1, & D_h \leq \sum w_i T_a \text{ and } D_v \leq \sum w_i T_a \\ 0, & \text{otherwise} \end{cases}$$

If $\beta_i$ is equal to 1, the central pixel is natural image information. Otherwise, it means that the central pixel experiences interference from impulse noise. Then, the median filter is utilized to reduce image noise.

Figure 6:
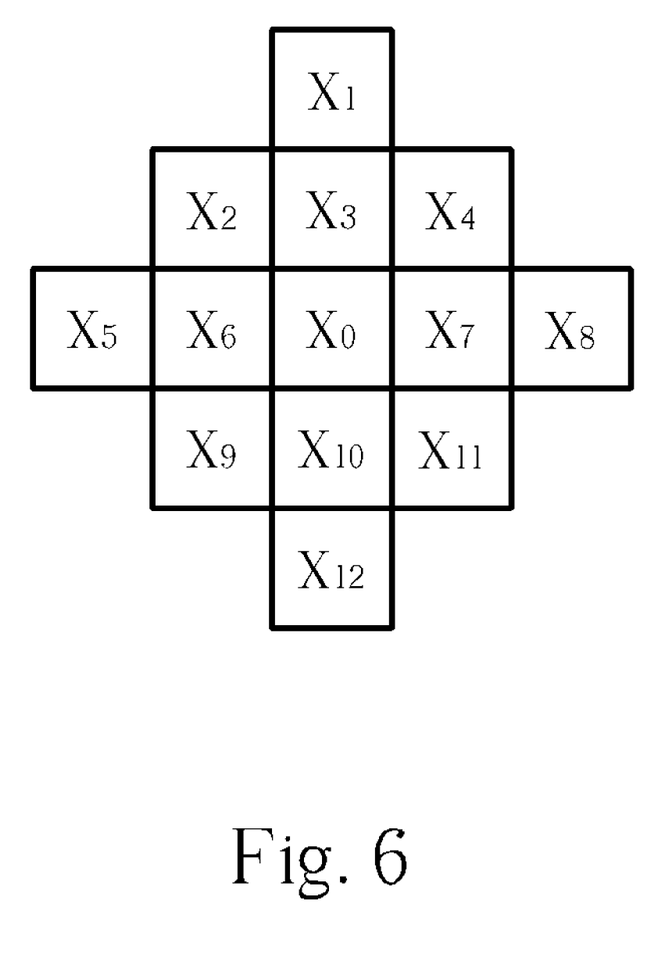
FIG. 6 is a diagram of a working window of an embodiment according to the present invention.

Please refer to FIG. 6. As shown in FIG. 6, a diamond-shaped working window is utilized to reduce image noise. $X_0$ represents a central pixel, and $X_1$~$X_{12}$ represent the neighboring pixels. The algorithm can be expressed by the following equation:

$$D_h = |3 \times X_0 - 0.5 \times X_5 - X_6 - X_7 - 0.5 \times X_8|$$

$$D_v = |3 \times X_0 - 0.5 \times X_1 - X_3 - X_{10} - 0.5 \times X_{12}|$$

If both $D_h$ and $D_v$ are less than the third predetermined value $T_a$, the central pixel is regarded as natural image information. Otherwise, it means that the central pixel experiences interference from impulse noise. Then, the median filter is utilized to reduce image noise.

Figure 7:
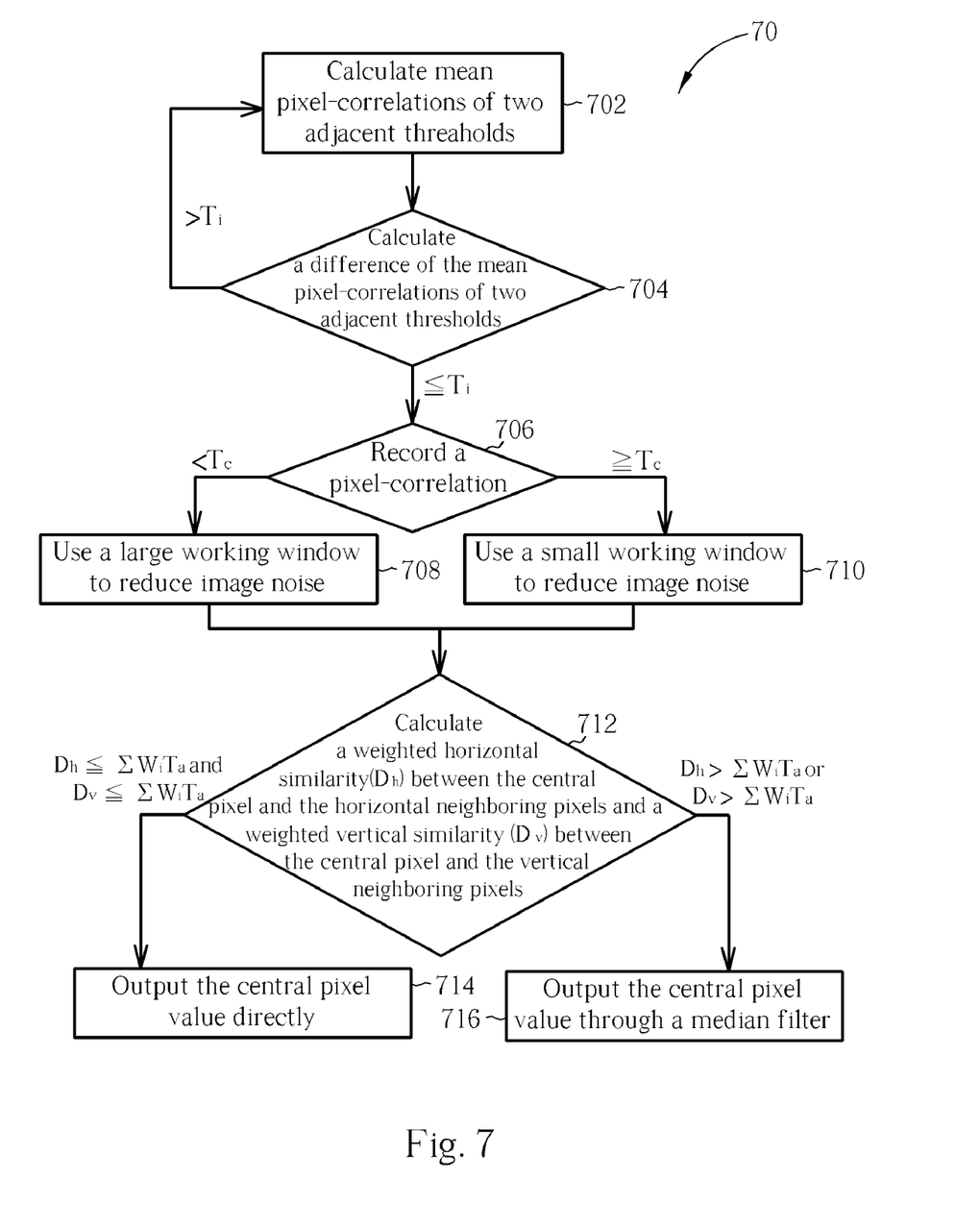
FIG. 7 is a flowchart of a method for reducing image noise according to the present invention.

Please refer to FIG. 7. The process 70 of the image noise reduction method comprises the following steps:

Step 702: Calculate mean pixel-correlations of two adjacent thresholds;

Step 704: Calculate a difference of the mean pixel-correlations of the two adjacent thresholds;

Step 706: Determine whether the difference is less than or equal to the first predetermined value ($T_t$), and if so, record a pixel-correlation;

Step 708: Determine whether the pixel-correlation is less than the second predetermined value ($T_c$), and if so, use a large working window to reduce image noise;

Step 710: Determine whether the pixel-correlation is greater than or equal to the second predetermined value ($T_c$), and if so, use a small working window to reduce image noise;

Step 712: Calculate a weighted horizontal similarity ($D_h$) between the central pixel and the horizontal neighboring pixels and a weighted vertical similarity ($D_v$) between the central pixel and the vertical neighboring pixels;

Step 714: Determine whether both the weighted horizontal similarity ($D_h$) between the central pixel and the horizontal neighbor pixels and the weighted vertical similarity ($D_v$) between the central pixel and the vertical neighbor pixels are less than or equal to a third predetermined value ($T_a$), and if so, output the central pixel value directly; and Step 716: Determine whether both the weighted horizontal similarity ($D_h$) between the central pixel and the horizontal neighbor pixels and the weighted vertical similarity ($D_v$) between the central pixel and the vertical neighbor pixels are greater than the third predetermined value ($T_a$), and if so, output the central pixel value through a median filter.

Figure 8:
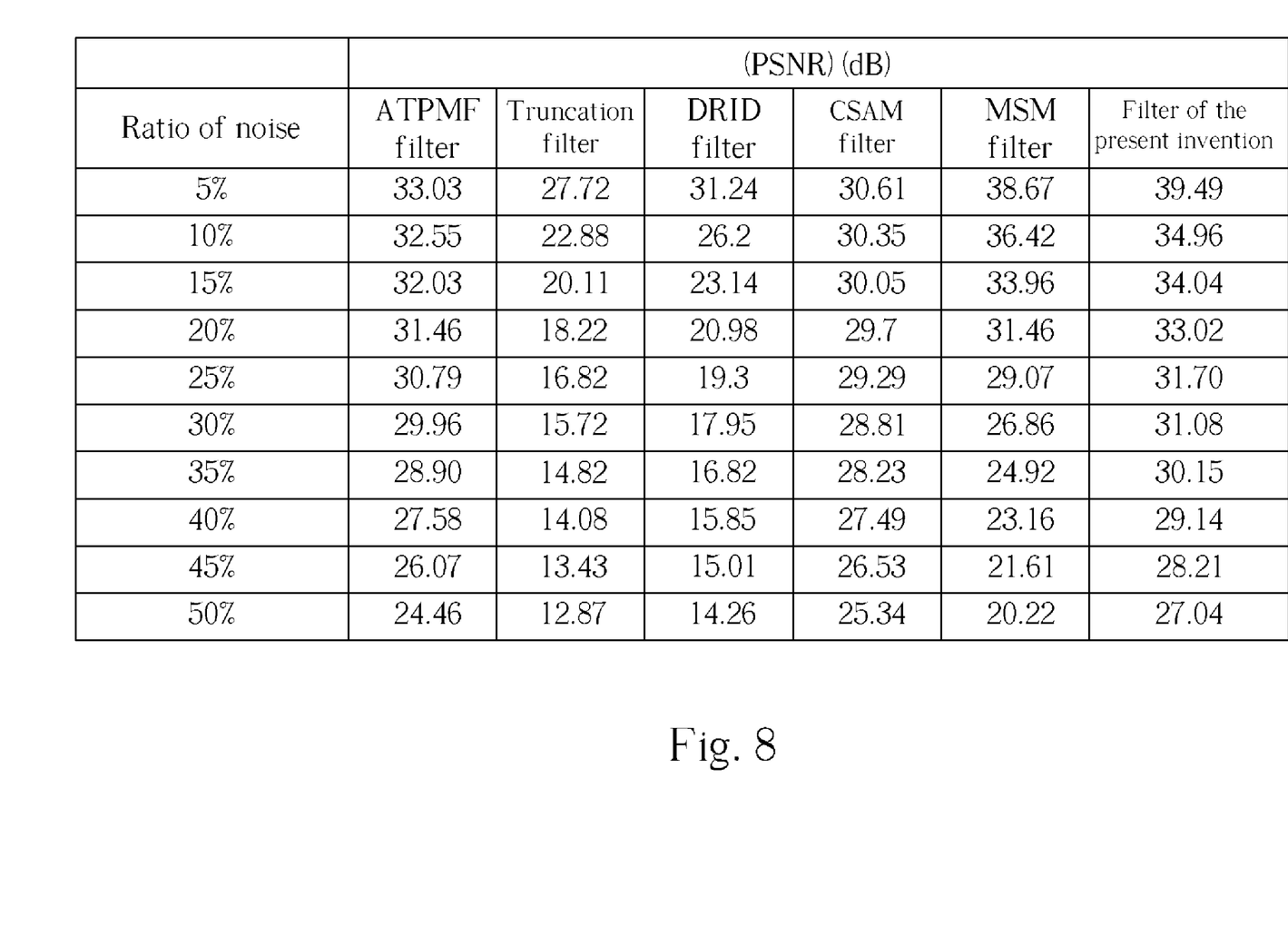
FIG. 8 is a PSNR diagram comparing the present invention with the prior art based on the test image (Lena).

Please refer to FIG. 8. Random-generated impulse noise is added into the test image (Lena), wherein the ratio of the impulse noise is from 5% to 50%, and the values of pixels are distributed uniformly between 0 and 255.

Figure 9:
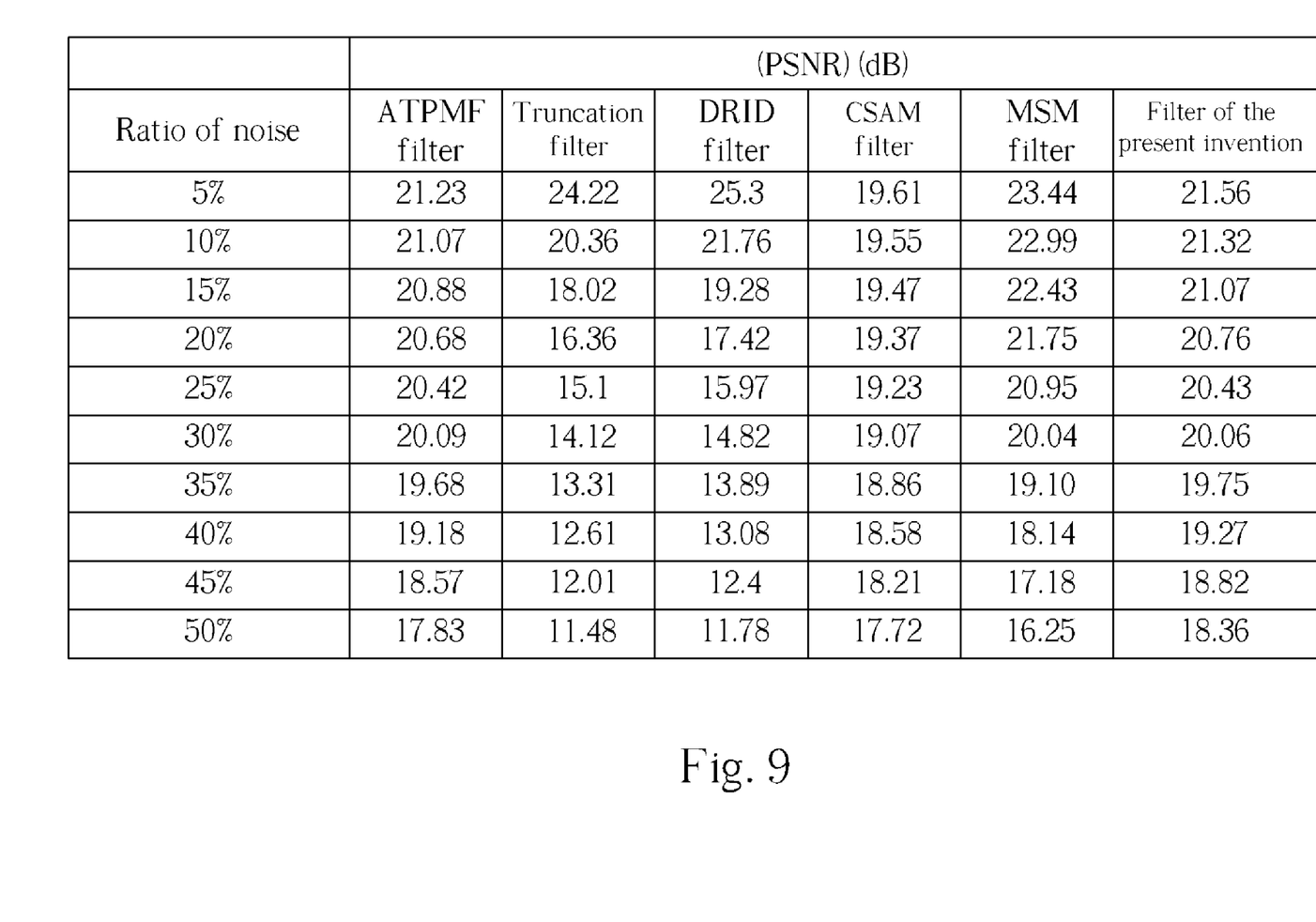
FIG. 9 is a PSNR diagram comparing the present invention with the prior art based on the test image (Lizard).

Please refer to FIG. 9. Random-generated impulse noise is added into the test image (Lizard), wherein the ratio of the impulse noise is from 5% to 50%, and the values of pixels are distributed uniformly between 0 and 255.

In summary, a new pixel-correlation calculating method is defined, and the defined pixel-correlation is utilized for estimating an appropriate working window to reduce image noise in the present invention. Furthermore, the method for estimating an appropriate working window can be applied to other noise-reduction methods to improve the noise-reduction efficiency.

The method for reducing image noise according to the present invention can be utilized in an image processing system or a signal processing system. And, the present invention can also be achieved by function codes saved in a computer-readable medium, such as an optical disk or a diskette. That is to say, the present invention can be achieved through installing the said function codes saved in the said medium into a computer system.

Additionally, the method for reducing image noise according to the present invention can be also realized in an integrated circuit. The integrated circuit can be integrated into various kinds of devices so as to execute the method for reducing image noise according to the present invention.

The embodiments mentioned above are used for illustration of the present invention only, and do not limit the present invention. The parameters mentioned above, such as $T_t$, $T_c$ or $T_a$, are not limited to fixed values and can vary according to the characteristics of images to improve noise-reduction efficiency.

Finally, the shape of the working window mentioned above can be a diamond or another appropriate geometric shape. The size of the working window can be also adjusted according to the ratio of noise. In addition, the number of times image noise reduction is performed can also be adjusted to control the effect and the processing speed of image noise reduction according to a user's demand.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reducing image noise comprising:

dividing an image into geometric working windows by a computer system, each geometric working window being composed of a central pixel and its neighboring pixels;

calculating pixel-correlations of two adjacent thresholds by the computer system;

calculating a difference of the pixel-correlations of the two adjacent thresholds by the computer system;

determining whether the difference is less than or equal to a first predetermined value by the computer system, and if so, recording a pixel-correlation by the computer system;

determining whether the pixel-correlation is less than a second predetermined value by the computer system, and if so, using a large working window to reduce image noise by the computer system;

determining whether the pixel-correlation is greater than or equal to the second predetermined value by the computer system, and if so, using a small working window to reduce image noise by the computer system;

calculating a weighted horizontal similarity between the central pixel and horizontal neighbor pixels and a weighted vertical similarity between the central pixel and vertical neighbor pixels by the computer system;

determining whether both the weighted horizontal similarity between the central pixel and the horizontal neighbor pixels and the weighted vertical similarity between the central pixel and the vertical neighbor pixels are less than or equal to a third predetermined value by the computer system, and if so, outputting the central pixel value directly by the computer system; and determining whether both the weighted horizontal similarity between the central pixel and the horizontal neighbor pixels and the weighted vertical similarity between the central pixel and the vertical neighbor pixels are greater than the third predetermined value by the computer system, and if so, outputting the central pixel value through a median filter by the computer system.

2. The method of claim 1, wherein the shape of each working window can be a diamond.

3. The method of claim 1, wherein the pixel correlation is equal to a calculated value based on each pixel weighted value being the inverse of Euclidean distance.

4. A computer-readable medium for saving function codes so as to make a computer system perform the method of claim 1.

5. A computer-readable medium for saving function codes so as to make a computer system perform the method of claim 2.

6. A computer-readable medium for saving function codes so as to make a computer system perform the method of claim 3.

* * * * *